(12) United States Patent
Lobo et al.

(10) Patent No.: US 7,735,074 B2
(45) Date of Patent: Jun. 8, 2010

(54) CODE OUTLINING WITHOUT TRAMPOLINES

(75) Inventors: Sheldon Lobo, Cary, NC (US); Fu-Hwa Wang, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1239 days.

(21) Appl. No.: 11/252,093

(22) Filed: Oct. 17, 2005

(65) Prior Publication Data

US 2007/0089106 A1 Apr. 19, 2007

(51) Int. Cl.
*G06F 9/45* (2006.01)
*G06F 9/44* (2006.01)
(52) U.S. Cl. .................. 717/158; 717/155; 717/162
(58) Field of Classification Search ......... 717/140–167, 717/151, 153–159
See application file for complete search history.

(56) References Cited

U.S. PATENT DOCUMENTS

| | | | |
|---|---|---|---|
| 5,564,031 A | 10/1996 | Amerson et al. | 395/419 |
| 6,175,957 B1 * | 1/2001 | Ju et al. | 717/156 |
| 6,356,903 B1 | 3/2002 | Baxter et al. | 707/10 |
| 6,502,237 B1 | 12/2002 | Yates et al. | 717/316 |
| 6,651,066 B2 | 11/2003 | Baxter et al. | 707/10 |
| 6,658,642 B1 | 12/2003 | Megiddo et al. | 717/101 |
| 6,802,056 B1 | 10/2004 | Chaiken et al. | 717/136 |
| 6,839,895 B1 * | 1/2005 | Ju et al. | 717/159 |

OTHER PUBLICATIONS

Karl Pettis, et al., "Profile Guided Code Positioning", Jun. 1990, Proceedings of the ACM SIGPLAN '90 Conference on Programming Language Design and Implementation, pp. 16-27.*
Rajat P. Garg, et al., "Techniques for Optimizing Applications: High Performance Computing", Jul. 25, 2001, Prentice Hall, Chpater 7, section "Linking Overview".*

* cited by examiner

*Primary Examiner*—Wei Y Zhen
*Assistant Examiner*—Chung Cheng
(74) *Attorney, Agent, or Firm*—Dorsey & Whitney LLP

(57) ABSTRACT

A system and method for optimizing compiler performance including outlining cold code at link time, rather than compile time, such that trampolines are not required. Branch instructions connecting a hot block to a cold block can be converted from a short branch distance limit to a longer branch distance limit, further optimizing code performance. Editors, implementing a plurality of windows that can be maintained for each function, can display the maximum distance that code blocks can be safely outlined. Other implementations allow the optimal placement of code that is significantly greater in size than the maximum possible branch distance.

15 Claims, 4 Drawing Sheets

CODE OUTLINING WITHOUT TRAMPOLINES

BACKGROUND OF THE INVENTION

1. Field of the Invention

The present invention relates in general to the field of software code development, and more particularly to application performance optimization through code outlining.

2. Description of the Related Art

Computer software applications continue to grow in size and complexity, generating large code bases in the process. Development of these applications has traditionally followed an iterative process of coding, compiling, debugging and optimization to improve code operation and/or performance. As the size of the code base increases, efficient memory hierarchy usage can be a factor in application performance.

In most computers, whenever a memory location is referenced by a program, the information located in the referenced location, along with information from nearby memory locations, is brought into a cache. While a hardware cache checks every requested address to determine whether the data is present, it is impractical to check whether every instruction in a program is present in the cache, as several overhead instructions may be used for every useful instruction executed. Program code is often divided into blocks which are loaded into the cache as a unit, and as long as execution proceeds within a block, no cache checks are needed. However, if the flow of control leaves a block, it may be necessary to check and determine whether the next block has already been loaded into the cache.

References to data currently in a cache-line can be one or two orders of magnitude faster than references to main memory. During the execution of a program, placement of memory address references is referred to as spatial locality, for reuse of a memory location within a cache-line, and temporal locality, when the same memory location is reused before its cache-line is evicted. The locality of a program can be improved by changing the order of computation (referred to as iteration reordering), or the assignment of data to memory locations (referred to as data reordering), so that references to the same or nearby locations occur relatively close in time during the execution of the program. In general, known compiler optimization techniques can maximize the instruction cache efficiency by iteratively reordering functions and basic blocks to improve both temporal and spatial locality. Such improvements are typically achieved by placing infrequently executed basic blocks (i.e., cold blocks), away from the main function body of frequently executed blocks (i.e., hot blocks), in an optimization technique referred to as "code outlining."

Control is typically transferred to and from hot and cold blocks via a control transfer instruction (CTI). Reduced instruction set computer (RISC) architectures typically use 32-bit fixed length instruction formats to improve the speed of instruction fetch and decoding. While this fixed length feature limits the distance between the CTI instruction and its target, thereby limiting the maximum distance between the hot and cold blocks, the fixed length also limits the optimal potential performance of basic block outlining. Without knowledge and control over the final code layout, a compiler generally uses a "trampoline" to redirect execution flow to outlined cold blocks. A trampoline is a relatively small piece of code, typically created at run time, that enables branches to occur outside of the confines of more or less contiguous binary program code.

For example, FIG. 1, labeled prior art, shows a code outlining optimization implementation using trampolines. The code outlining optimization implementation includes computer system 100 having main memory 112, which contains operating system 114, which allows implementation of compiler 118, and linker 122. Compiler 118 converts source code 116 into object code 120, which is linked by linker 122 into executable code 124. Source code 116 may include any computer program written in a high-level programming language. Executable code 124 includes executable instructions for a specific virtual machine or specific processor architecture. Compiler 118 interacts with code outliner 126 to place infrequently executed basic blocks (i.e., cold blocks), away from the main function body of frequently executed blocks (i.e., hot blocks). Code outliner 126 includes a trampoline insertion module 128 to insert trampolines to enable branches to occur outside of the confines of more or less contiguous binary object code 120.

In some cases, these branches can occur when seldomly executed basic blocks (cold blocks) are located beyond a predetermined branch distance limit such as in RISC architectures. The introduction of trampoline code, placed within a CTI's target distance limit can solve the distance limitation problem, but can incur performance penalty in the process. Furthermore, introduction of additional instructions such as trampolines, can cause an increase in the number of instructions executed, and additional control redirection which can impact instruction cache efficiency. What is needed is a way to achieve the benefits of code outlining without incurring the performance penalties incurred through the use of trampolines.

SUMMARY OF THE INVENTION

In accordance with the present invention, a method is set forth for outlining cold code without trampolines. The method includes a plurality of independent features. More specifically, the method includes identifying cold blocs of code using heuristics and profile data acquired from a training run; converting small branch distance instructions to larger branch distance instructions; laying out code one function at a time since execution control between functions is achieved by call instructions, which can have essentially infinite distance branches; and maintaining a window of a maximum branch distance on a function level, so that blocks within a function may be reached without the need for a trampoline insertion. In this method, optimization is performed not at compile time, but at link time. In this method, an entire program view is available, and a link-time optimizer has control over code placement. For example, cold blocks to be outlined can be placed just within the branch distance of the branch instruction that performs the control transfer. Likewise, branch instructions with shorter branch distance spans can be converted to other available branch instructions that have longer branch distance spans.

Thus, in one embodiment, cold blocks are identified through the use of heuristics, and profile data acquired from a training run. In another embodiment, if the branch instruction connecting a hot block with a cold block is found to have a short branch distance limit, the branch instruction can be converted to a different branch instruction that has a longer branch distance limit. In another embodiment, all basic blocks (hot and cold) for a function can be laid out before placing code for the next function. In another embodiment, a window can be maintained for each function, showing the maximum distance that blocks can be safely outlined. In this embodiment, hot and cold blocks can be respectively placed in separate hot and cold compartments. A plurality of distinct hot and cold fragments can be present within a function. After all hot and cold blocks have been placed appropriately, the window can then be slid to the bottom of the function, and the above steps can be repeated to lay out the next function. By placing hot and cold code blocks one function at a time, advantage can be taken of the fact that execution control is transferred from one function to another by call instructions.

Use of this windowing method can assist in producing an optimal code layout without the use of trampolines. In addition, this method can also allow placement of code that is significantly greater in size than the maximum possible branch distance. For example, if the maximum branch distance is 1 megabyte, typically code that is 1.5 megabytes in size can be placed in one hot-cold compartment. This can be advantageous, since greater spatial instruction cache locality can be achieved by optimizing the number of contiguous hot code blocks.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Although the present invention has been described in detail, it should be understood that various changes, substitutions and alterations can be made hereto without departing from the spirit and scope of the invention as defined by the appended claims.

Figure 1:
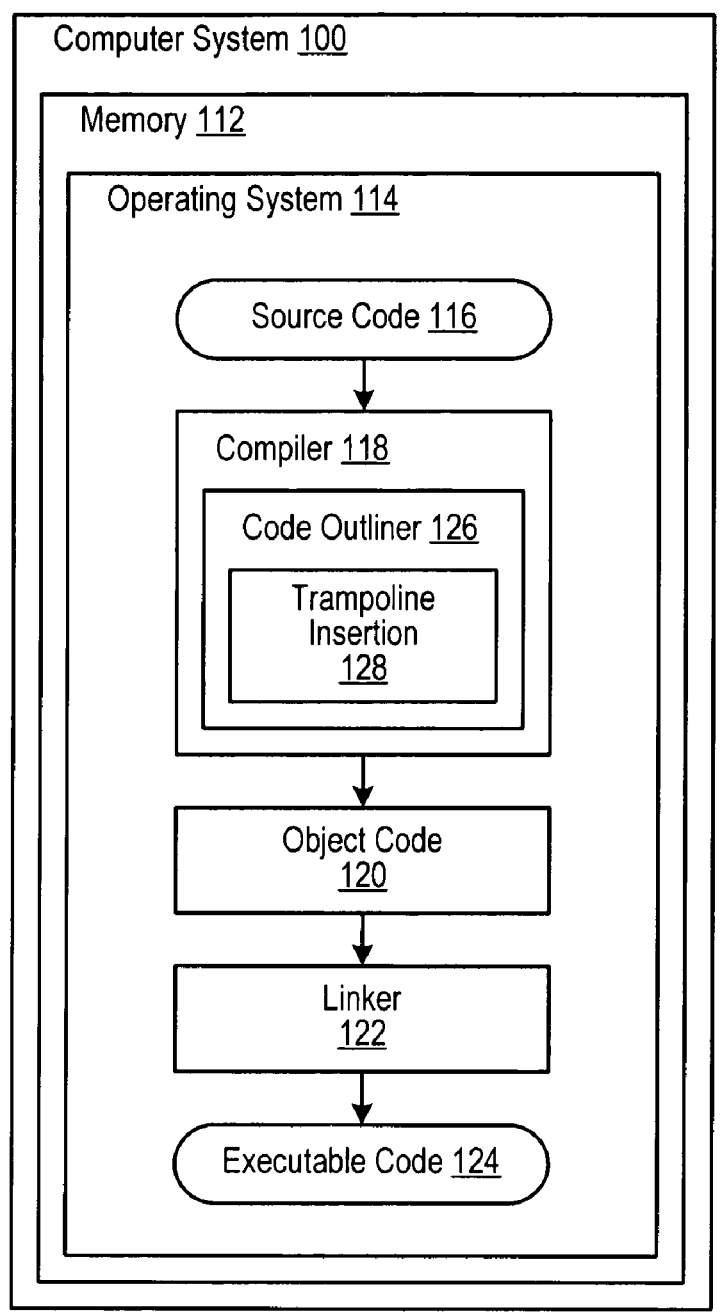
FIG. 1, labeled prior art, shows a block diagram of code outlining optimization implementation using trampolines.
Figure 2:
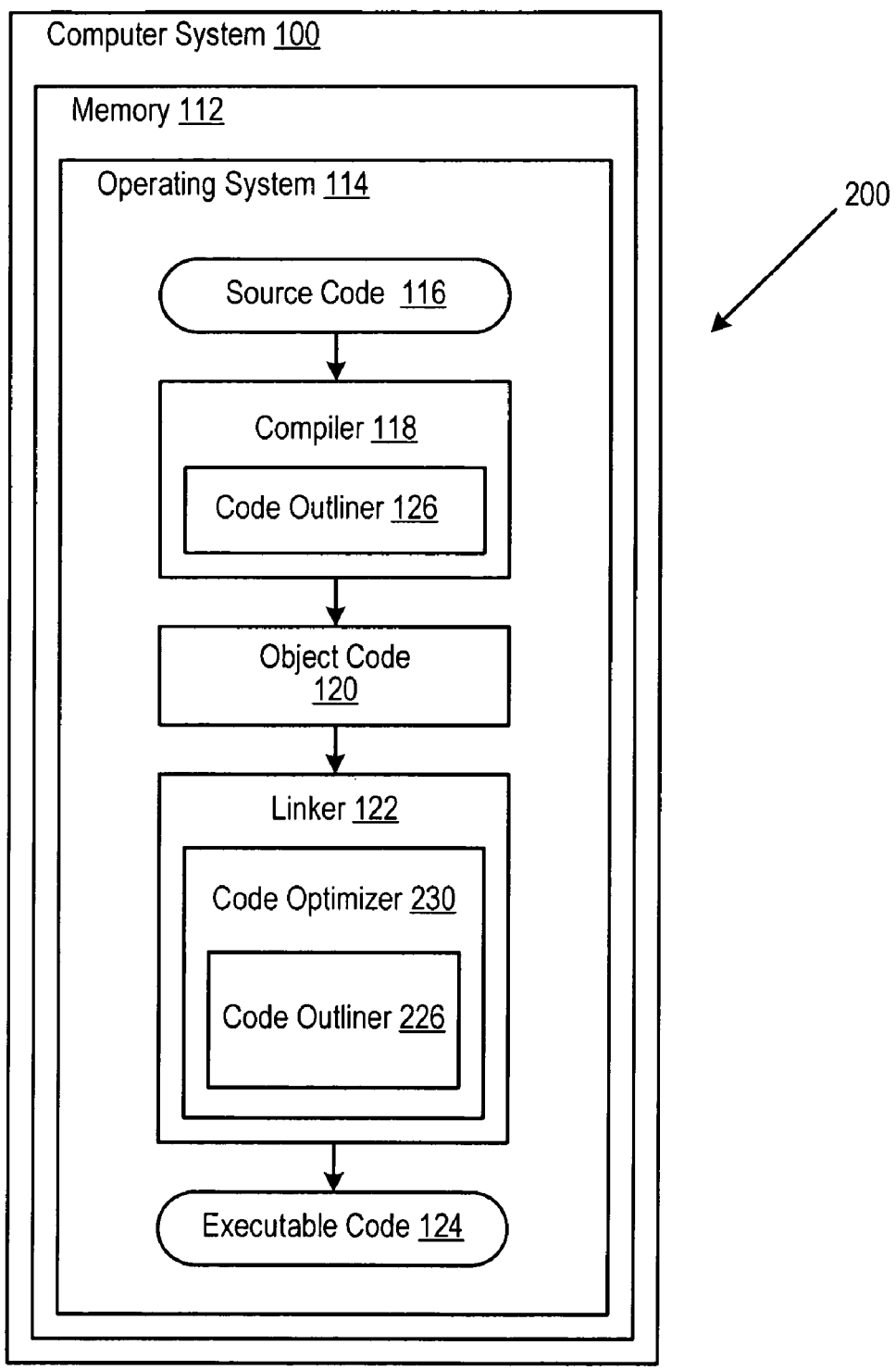
FIG. 2 shows a block diagram of code outlining optimization implementation such that trampolines are not required.

Referring to FIG. 2, a computer system having a code outlining optimization implementation that outlines cold code at link time instead of compile time such that trampolines are not required is shown. Code outlining optimization implementation 200 includes computer system 100 having main memory 112 which contains operating system 114, which allows implementation of compiler 118, and linker 122. Compiler 118 converts source code 116 into object code 120 which is linked by linker 122 into executable code 124. Source code 116 may include any computer program written in a high-level programming language. Executable code 124 includes executable instructions for a specific virtual machine or specific processor architecture.

Compiler 118 interacts with code outliner 126 to place infrequently executed basic blocks (i.e., cold blocks), away from the main function body of frequently executed blocks (i.e., hot blocks). Code outliner 126 may be implemented to insert trampolines via a trampoline insertion module 128 to enable branches to occur outside of the confines of more or less contiguous binary object code 120. Additionally, linker 122 also includes a code outliner 226 which is included within a code optimizer 230. Code outliner 126 may be implemented to not insert trampolines 128 into binary object code 120 and just rely on code outliner 226 to optimize the code. In either case, linker 122, as described in more detail below, interacts with code optimizer 230 to provide an entire program view and iteratively reorder hot and cold blocks of code to improve temporal and spatial locality.

Figure 3:
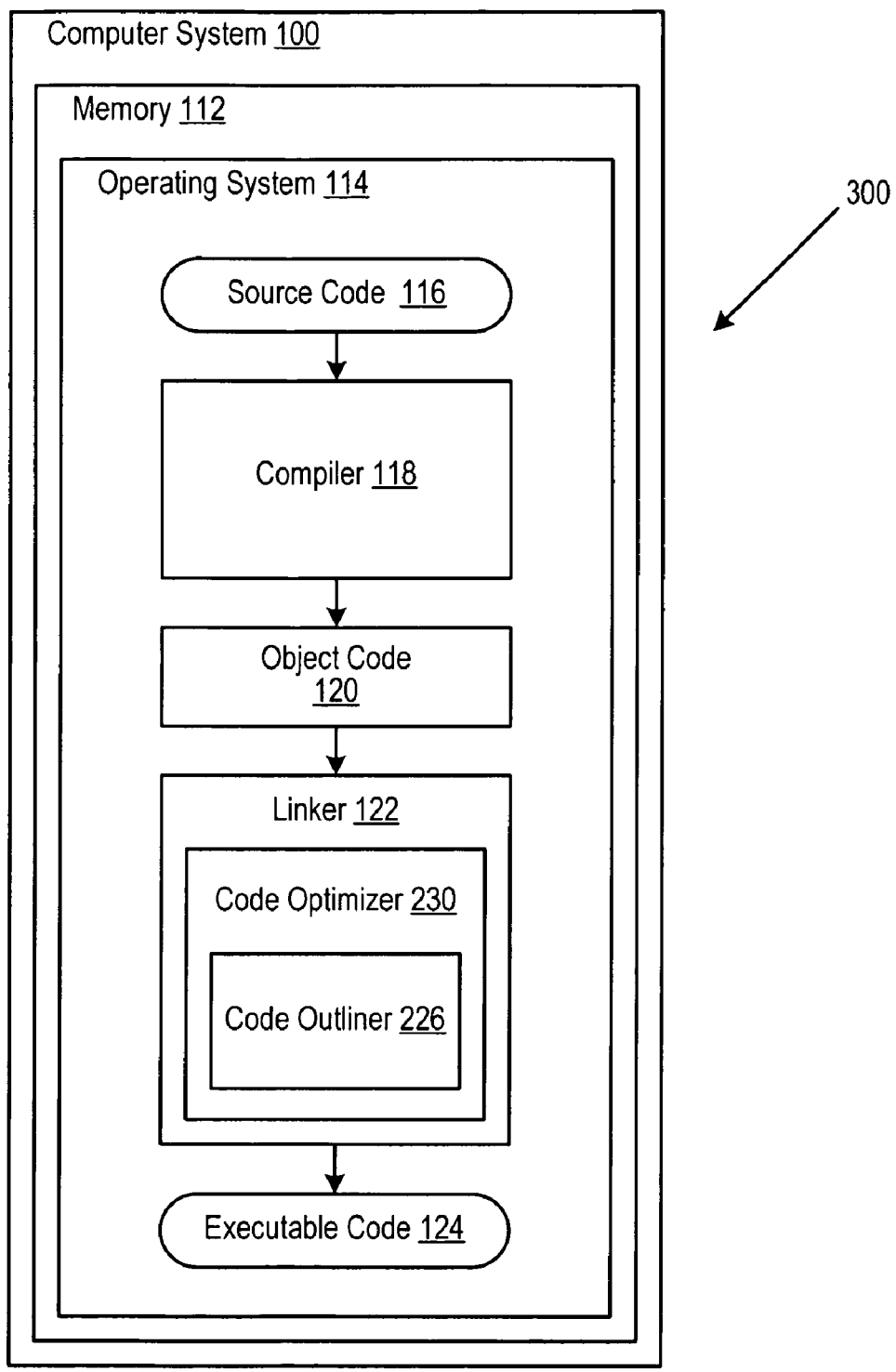
FIG. 3 shows a block diagram of an alternate code outlining optimization implementation.

Referring to FIG. 3, a block diagram of an alternate code outlining optimization implementation is shown. In the alternate code outlining optimization, code outlining may be performed exclusively at link time without any trampoline insertion. Thus, an operating system 714 may be implemented to provide a code outline optimizer 230 without a trampoline insertion module 128.

Figure 4:
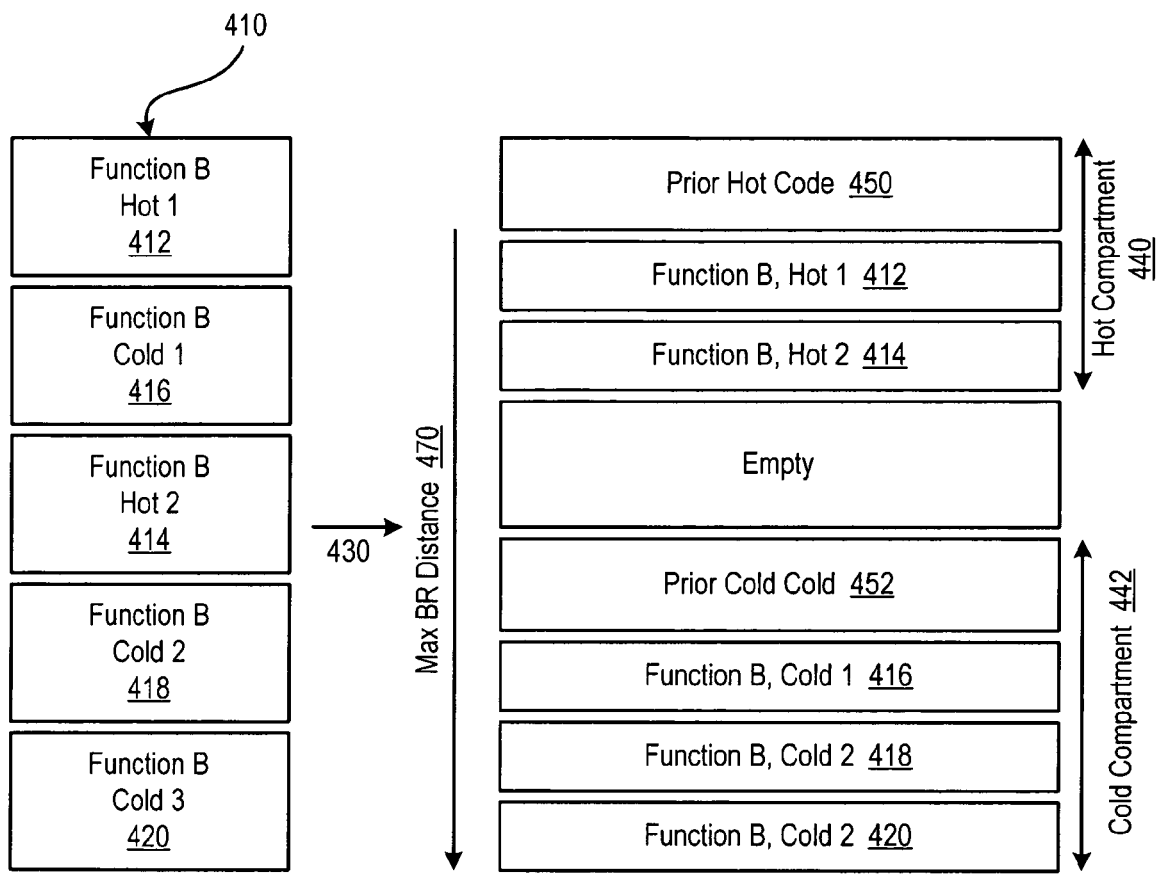
FIG. 4 shows a block diagram of a code outlining operation

Referring to FIG. 4, a block diagram of an outlining operation is shown. In general, a window conforming to a maximum branch distance is used to layout hot and cold blocks of code as far away as possible without the need for trampolines. As the window move with the code being laid out, subsequent functions are laid out in an empty compartment until the hot compartment is contiguous with the cold compartment.

More specifically, a portion of code 410 on which code outlining is performed, e.g., Function B, includes a plurality of hot blocks, e.g., Function B Hot 1 412 and Function B Hot 2 414, and a plurality of cold blocks, e.g., Function B Cold 1 416, Function B Cold 2 418 and Function B Cold 3 420. The cold blocks of code are identified using heuristics and profile data obtained from a training run of the code 410.

The code outlining optimization 430 is performed on the code. After the code outlining function is performed, the hot and cold blocks of code are laid out as far away as possible without the need for trampolines.

More specifically, the hot blocks of code are laid out within a hot compartment 440 and the cold blocks of code are laid out within a cold compartment 442. Prior hot blocks of code 450 are also located within the hot compartment 440 and prior cold blocks of code 452 are also located within the cold compartment 442.

When laying out the code, a window 470 is maintained representing a maximum branch distance on a function level. The window allows the cold blocks of code to be placed such that trampoline code is not necessary to access the cold block from a control transfer instruction.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

At a minimum, use of the invention will provide an approach for compiler optimization by outlining cold code at link time, rather than compile time, such that trampolines are not required. In addition, the invention can convert branch instructions connecting a hot block to a cold block from a short branch distance limit to a longer branch distance limit, further optimizing code performance. Furthermore, the invention can include implementing a plurality of windows that can be maintained for each function, showing the maximum distance that blocks can be safely outlined. In addition, other implementations of the invention allow the optimal placement of code that is significantly greater in size than the maximum possible branch distance.

Consequently, the invention is intended to be limited only by the spirit and scope of the appended claims, giving full cognizance to equivalents in all respects.

What is claimed is:

1. A method of outlining code comprising:
identifying, by a code outliner running on a computer system, cold blocks of code;
identifying, by the code outliner running on the computer system, branch instructions that connect a hot block of code to a cold block of code;
converting, by the code outliner running on the computer system, the branch instructions that connect the hot block of code to the cold block of code from a short branch distance to other available branch instructions that have longer branch distance spans relative to the short branch distance to thereby form a converted branch instruction;
performing, by a linker running on the computer system at link time, an optimization including placing all cold blocks to be outlined within a branch distance of the converted branch instruction.

2. The method of claim 1 further comprising:
identifying cold blocks of code via heuristics and profile data acquired from a training run of the code.

3. The method of claim 1 further comprising:
maintaining a window for at least a first function within the code, the window representing a maximum distance that a block can be outlined; and
placing hot blocks of code and cold blocks of code located within the window.

4. The method of claim 3 wherein:
a plurality of distinct hot blocks of code and cold blocks of code are present within the first function; and
moving the window from the first function to a second function after the plurality of distinct hot blocks of code and cold blocks of code of the first function have been placed.

5. The method of claim 3 wherein:
execution control is transferred from one function to another within the window.

6. An apparatus of outlining code comprising:
means for identifying cold blocks of code;
means for identifying branch instructions that connect a hot block of code to a cold block of code;
means for converting the branch instructions that connect the hot block of code to the cold block of code from a short branch distance to other available branch instructions that have longer branch distance spans relative to the short branch distance to thereby form a converted branch instruction;
means for performing an optimization at link time, the optimization including placing all cold blocks to be outlined within a branch distance of the converted branch instruction.

7. The apparatus of claim 6 further comprising:
means for identifying cold blocks of code via heuristics and profile data acquired from a training run of the code.

8. The apparatus of claim 6 further comprising:
means for maintaining a window for at least a first function within the code, the window representing a maximum distance that a block can be outlined; and means for placing hot blocks of code and cold blocks of code located within the window.

9. The apparatus of claim 8 wherein:
a plurality of distinct hot blocks of code and cold blocks of code are present within the first function; and
further comprising means for moving the window from the first function to a second function after the plurality of distinct hot blocks of code and cold blocks of code of the first function have been placed.

10. The apparatus of claim 9 wherein:
execution control is transferred from one function to another within the window.

11. A code outliner comprising:
a cold block module running on a computer system, the cold block module identifying cold blocks of code;
a control transfer identification module running on the computer system, the control transfer identification module identifying branch instructions that connect a hot block of code to a cold block of code;
a conversion module running on the computer system, the conversion module converting the branch instructions that connect the hot block of code to the cold block of code from a short branch distance to other available branch instructions that have longer branch distance spans relative to the short branch distance to thereby form a converted branch instruction; and,
an optimizer module running on the computer system, the optimizer module placing all cold blocks to be outlined within a branch distance of the converted branch instruction.

12. The code outliner of claim 11 wherein:
cold blocks of code are identified via heuristics and profile data acquired from a training run of the code.

13. The code outliner of claim 11 further comprising:
a window module, the window module maintaining a window for at least a first function within the code, the window representing a maximum distance that a block can be outlined; and
wherein hot blocks of code and cold blocks of code are placed located within the window.

14. The code outline of claim 13 wherein:
a plurality of distinct hot blocks of code and cold blocks of code are present within the first function; and
the window module moves the window from the first function to a second function after the plurality of distinct hot blocks of code and cold blocks of code of the first function have been placed.

15. The code outline of claim 13 wherein:
execution control is transferred from one function to another within the window.

* * * * *

UNITED STATES PATENT AND TRADEMARK OFFICE
CERTIFICATE OF CORRECTION

PATENT NO. : 7,735,074 B2  
APPLICATION NO. : 11/252093  
DATED : June 8, 2010  
INVENTOR(S) : Sheldon Lobo et al.

Page 1 of 1

It is certified that error appears in the above-identified patent and that said Letters Patent is hereby corrected as shown below:

On the title page, item (56), in column 2, under "Other Publications", line 5, delete "Chpater" and insert -- Chapter --, therefor.

On sheet 4 of 4, in Figure 4, Box 452, line 1, delete "Cold Cold" and insert -- Cold Code --, therefor.

In column 3, line 33, delete "operation" and insert -- operation. --, therefor.

Signed and Sealed this  
Twenty-sixth Day of July, 2011

David J. Kappos  
*Director of the United States Patent and Trademark Office*